No. 671,103.  
J. W. D. CARSLAW.  
TIRE FOR VEHICLE WHEELS.  
(Application filed Dec. 13, 1900.)

Patented Apr. 2, 1901.

(No Model.)

Witnesses  
G. A. Tauberschmidt  
Louis J. Delson

Inventor  
John W. D. Carslaw,  
By Charles N. Hill,  
Atty.

THE NORRIS PETERS CO., PHOTO-LITHO., WASHINGTON, D. C.

UNITED STATES PATENT OFFICE.

JOHN W. D. CARSLAW, OF CHICAGO, ILLINOIS.

TIRE FOR VEHICLE-WHEELS.

SPECIFICATION forming part of Letters Patent No. 671,103, dated April 2, 1901.

Application filed December 13, 1900. Serial No. 39,660. (No model.)

*To all whom it may concern:*

Be it known that I, JOHN W. D. CARSLAW, a subject of the Queen of Great Britain, and a resident of Chicago, in the county of Cook and State of Illinois, have invented certain new and useful Improvements in Tires for Vehicle-Wheels; and I do hereby declare that the following is a full, clear, and exact description thereof, reference being had to the accompanying drawings, and to the letters of reference marked thereon, which form a part of this specification.

This invention relates to improvements in tires for vehicle-wheels, and is shown more particularly in relation to a carriage-wheel.

Heretofore in devices of this class difficulty has been found in securing the cushion-strip of the tire to the wheel, it being a common experience that such cushion-strips frequently roll from the channel-retaining strip owing to the defective fastening devices.

The object of this invention is to provide simple and effective means for retaining the cushion-strip at all times in operative position.

The invention consists of the matters hereinafter described, and more fully pointed out and defined in the appended claims.

Figure 1:
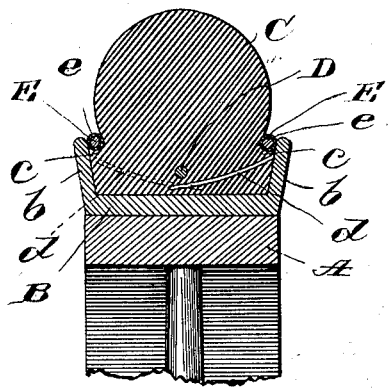
Figure 2:
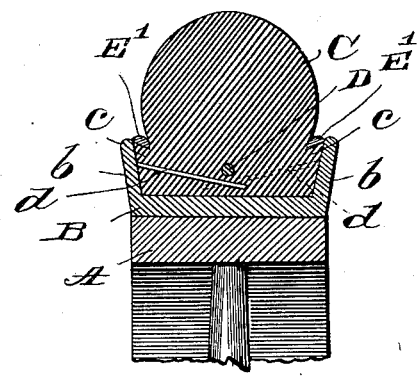
Figure 3:
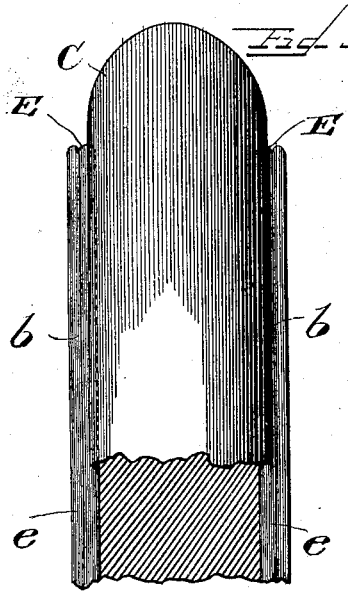
Figure 4:
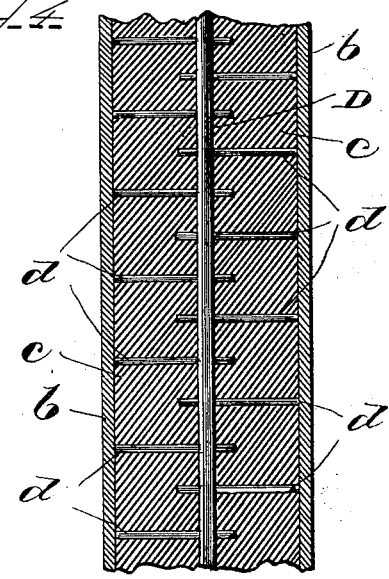

In the drawings, Figures 1 and 2 are sections of a tire embodying my invention. Fig. 3 is a fragmentary elevation of the same. Fig. 4 is a longitudinal section through the cushion-strip.

In said drawings my improved tire is shown in connection with the rim A of a vehicle-wheel of any desired kind, on the periphery of which is secured a channel-iron tire or rim B, provided with outwardly-directed slightly-flaring flanges $b$ $b$. C indicates a cushion-strip, of rubber or other resilient material, of such shape at its base and of sufficient size to fit closely within said channel iron or rim B. Said strip consists of a central rounded portion adapted to form the tread of the wheel and provided on each side with shoulders $c$ $c$ of the same height as the flanges $b$ $b$ on the channel-iron B.

D indicates a rod or wire of metal bedded in the cushion-strip C, centrally near the base of the same, and which when the cushion-strip is in position in the channel of the rim is drawn together and the ends permanently united, thereby acting as one of the retaining means. A plurality of relatively short rods or wires $d$ $d$ are also bedded in the cushion-strip and extend from opposite sides of the same at points below the shoulders $c$ $c$ to points below and beyond the rod or wire D, as indicated in Figs. 1, 2, and 4. Said rods or wires $d$ $d$ are arranged staggering on opposite sides of the cushion-strip and preferably but a short distance apart, and incline centrally and downwardly at the inner ends until but a relatively thin portion of the rubber is between the same and the channel or rim when in place.

E E indicate metallic bands or wires, as shown, provided with an insulated coating. Said bands E E are passed over the flanges $b$ $b$, respectively, and engage the shoulders $c$ $c$, acting to compress the base of said cushion-strip into said channel-rim. Said bands may be of any desired form, either cylindric in cross-section, as shown in Fig. 1, or semicircular in cross-section, as indicated in Fig. 2, in which, as shown, the outer surface thereof is rounded and the inner surface thereof flattened to afford better engagement with the shoulders $c$ $c$. Obviously the rod D and the rods or wires $d$ $d$ may be inserted in the cushion-strip before the same is vulcanized and may be entirely concealed within the same.

The operation of my device is as follows: The rim of the wheel being provided with the channel-strip B, as before described, the rubber tire C, of suitable size, is inserted within the channel-strip, as indicated, and the bands E E are sprung into position. Said bands are formed of a strip of wire or the like having the ends integrally joined and made of slightly less diameter than the outer edge of the flanges $b$ $b$ and may be preferably secured on said shoulders by jumping them on. Obviously when in position said bands act to crowd said shoulders $c$ $c$ downwardly between said flaring flanges $b$ $b$, with the effect of crowding the rods $d$ $d$ inwardly beneath the rod D. Outward strain on said cushion-strip is distributed equally over the entire base by means of the said rods $d$ $d$ and the rod D. Inasmuch, however, as the bands E' and E' do not engage the rods $d$ there is no tendency of the rods to tear the rubber, thereby shortening the life of the tire. Furthermore, by insulating the bands E' and E', as indicated in Fig. 1, the said bands are protected from moisture and from contact with the flanges b b or the rubber of the tire, thereby not only protecting from oxidizing, but as well protecting the rubber from the changes due to such oxidation or to electrical action owing to contact with the rim.

Obviously many changes may be made in the details of construction as herein shown and described without departing from the principle of my invention.

I claim as my invention—

1. In a tire for vehicle-wheels in combination with the channel-strip adapted to be secured peripherally on the vehicle-wheel of a cushion-strip adapted to fit closely within said channel-strip projecting outwardly beyond the same, shoulders on each side of said cushion-strip approximately of the same height as the flanges on the channel-strip and provided with rods or wires bedded in said cushion-strip beneath said shoulders and extending from the outer side to a point below and beyond the center and an insulated band drawn about each of said shoulders and acting to bind the cushion-strip within said channel.

2. In a tire for vehicle-wheels the combination with a channel-strip adapted to be secured peripherally upon the rim of the wheel, of a cushion-strip fitting closely within the channel and projecting beyond the same, shoulders on each side of said cushion-strip approximately of the same height as the flanges on said channel-strip, a longitudinal wire or the like bedded therein centrally and approximately near its base and transverse rods or wires arranged staggering and extending from the outer side of the cushion-strip beneath the shoulders to points below and beyond said longitudinal wire and metallic bands drawn about said cushion-strip at the shoulders and acting to bind the same within the channel-strip.

3. In a device of the class described the combination with the channel-strip having outwardly-flaring flanges of a cushion-strip adapted to fit closely within said channel and comprising an outwardly-projecting central part and lateral shoulders approximately of the same height as said flanges, a rod or wire bedded in said cushion-strip centrally and approximately near the base, rods or wires extending transversely from the outer side of the cushion-strip beneath said shoulders to points below and beyond said central bedded rod or wire and means for retaining the cushion-strip in position in said channel comprising metallic bands provided with an insulating-coating drawn tightly about said shoulders.

4. An article of manufacture for the purpose specified, comprising a resilient cushion-strip having a central part adapted to form a tread-surface, shoulders on each side of said central tread-surface, a longitudinal wire or rod bedded centrally in said cushion-strip, approximately near the base and transverse rods or wires bedded in said cushion-strip arranged staggering and extending from beneath said shoulders to points below and beyond said longitudinal bedded rod or wire.

5. An article of manufacture for the purpose specified, comprising a resilient cushion-strip having a central part adapted to form a tread-surface, shoulders on each side of said tread-surface, a central aperture extending longitudinally through the cushion-strip, below the center and transverse rods or wires bedded in said cushion-strip arranged staggering and extending from beneath said shoulders obliquely downward to a point below and beyond said central aperture.

In witness whereof I have hereunto subscribed my name in the presence of two subscribing witnesses.

JOHN W. D. CARSLAW.

Witnesses:
C. W. HILLS,
L. J. DELSON.